United States Patent [19]

Gatewood

[11] 4,185,728
[45] Jan. 29, 1980

[54] CLUTCH DISC WITH VARIABLE DEFLECTION RATE VIBRATION DAMPER

[75] Inventor: Sidney U. Gatewood, Roseville, Mich.

[73] Assignee: Borg-Warner Corporation, Chicago, Ill.

[21] Appl. No.: 842,135

[22] Filed: Oct. 14, 1977

[51] Int. Cl.² .............................................. F16D 3/14
[52] U.S. Cl. .................................... 192/106.2; 64/27 C
[58] Field of Search ............... 192/106.2, 106.1, 70.16, 192/70.17, 55; 64/27 C

[56] References Cited

U.S. PATENT DOCUMENTS

| | | | |
|---|---|---|---|
| 3,101,600 | 8/1963 | Stromberg | 192/106.2 |
| 3,414,101 | 12/1968 | Binder et al. | 192/106.2 |
| 3,534,841 | 10/1970 | Schneider et al. | 192/106.2 |
| 3,556,273 | 1/1971 | Maucher | 192/106.2 |
| 4,024,938 | 5/1977 | Maucher | 192/106.2 |

FOREIGN PATENT DOCUMENTS

| | | | |
|---|---|---|---|
| 2148286 | 4/1973 | Fed. Rep. of Germany | 192/106.2 |
| 2508878 | 10/1975 | Fed. Rep. of Germany | 192/106.2 |
| 1196811 | 7/1970 | United Kingdom | 192/106.2 |
| 1233273 | 5/1971 | United Kingdom | 192/106.2 |

*Primary Examiner*—Benjamin Wyche
*Assistant Examiner*—David C. Reichard
*Attorney, Agent, or Firm*—James A. Geppert

[57] ABSTRACT

A torsional vibration damper assembly providing a variable torsional deflection rate having a very low initial deflection rate. The assembly utilizes a vibration damper assembly having a set of compression springs providing the torsional deflection rate for the main stage of relative angular displacement between the input and output members and an auxiliary resilient means to provide an extremely low initial torsional deflection rate; the auxiliary means comprising sets of interengaged free play splines between the barrel of the clutch hub and a separate hub flange with springs between the sets of teeth to preload the splines lightly in either the drive and/or coast directions.

3 Claims, 7 Drawing Figures

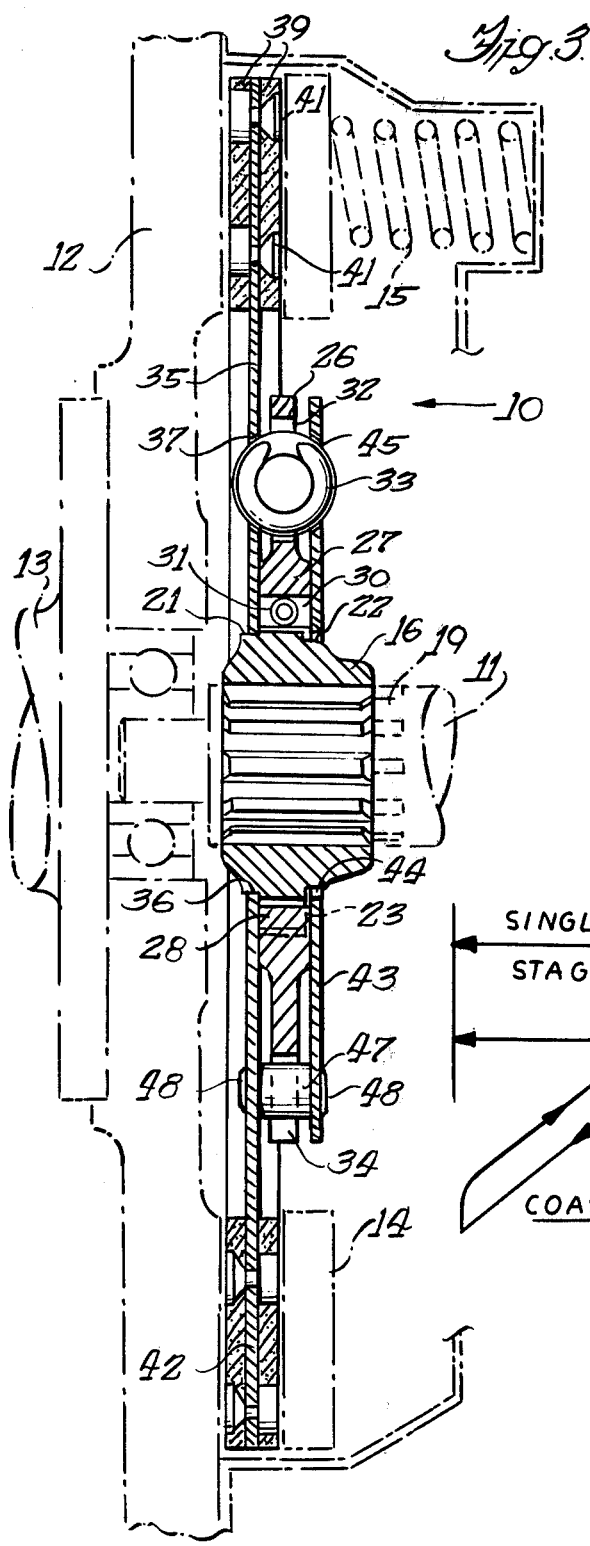
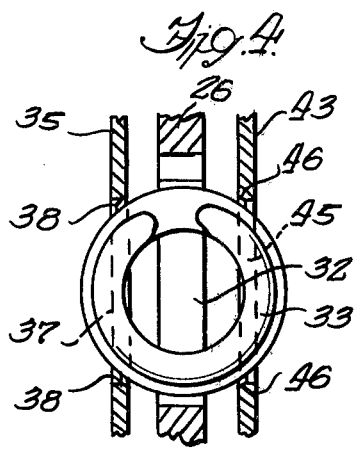
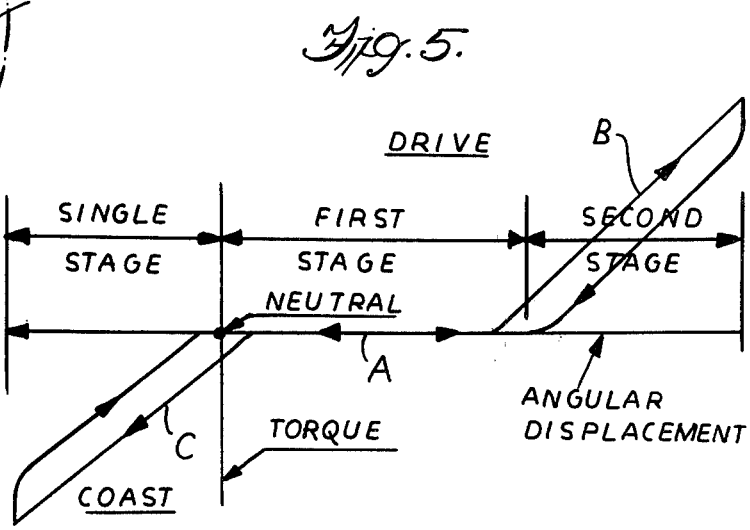

CLUTCH DISC WITH VARIABLE DEFLECTION RATE VIBRATION DAMPER

BACKGROUND AND SUMMARY OF THE INVENTION

A vibration damper assembly has been utilized in the clutch driven member for a motor vehicle power train to control engine induced torsional vibration in the connected elements of the power train. The vibration damper assembly is interposed in the clutch driven member ahead of a manually operated transmission to neutralize the torsional vibrations emanating from the vehicle engine, which vibrations would otherwise cause disturbing impact loads, pulsations, and noises in the transmission and driveline. A vibration damper may also be used for a lock-up clutch inserted into a torque converter for an automatic transmission where the vibrations in the direct drive mode as a result of the lock-up between the torque input and the drive shaft would not be hydraulically dampened by the torque converter vibration damping characteristics.

A conventional vibration damper assembly consists of a clutch hub splined to the output shaft to the transmission, a radially extending integral hub flange, a clutch plate and a spring retainer plate sandwiching the hub flange, and a plurality of compression springs received in circumferentially spaced aligned sets of openings in the plates and flange. The clutch plate and spring retainer plate are rigidly secured together, and the annular friction surfaces are carried on the opposed surfaces adjacent the outer periphery of the clutch plate.

However, special circumstances occur which require a vibration damper having special characteristics so as to control objectionable vibration and/or gear rattle in a transmission which may occur at neutral idle or under engine full load. The present vibration damper provides an extremely low rate of initial deflection to overcome gear rattle problems by effectively suppressing the propagation of torsional disturbances from the engine to the driven elements at idle, and also providing proper frequency tuning at higher engine speeds and loads.

The present invention comprehends the provision of a novel vibration damper assembly for use in an automotive vehicle clutch which provides a variable torsional deflection rate. The vibration damper provides an extremely low first stage torsional spring rate with no damping friction torque and a higher second stage torsional spring rate having an appropriate damping friction torque. The initial low torsional spring rate is provided by a loose spline connection between a clutch hub and a separate hub flange with one or more resilient members provided within the spline connection.

The present invention also comprehends the provision of a novel two-stage vibration damper where the first stage provides an extremely low torsional spring rate and the second stage provides a higher torsional spring rate, wherein the low torsional spring rate may be exerted in either the drive or coast direction or in both directions.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 3 is a vertical cross sectional view taken on the irregular line 3—3 of FIG. 1 and showing in dotted outline the environment for the clutch driven member.

FIG. 4 is an enlarged vertical cross sectional view through the windows and compression spring for the second stage of vibration damping.

FIG. 5 is a graphic representation of the relationship between torque and angular displacement for the damper assembly of FIGS. 1 through 4.

DESCRIPTION OF THE PREFERRED EMBODIMENTS

Figure 1:
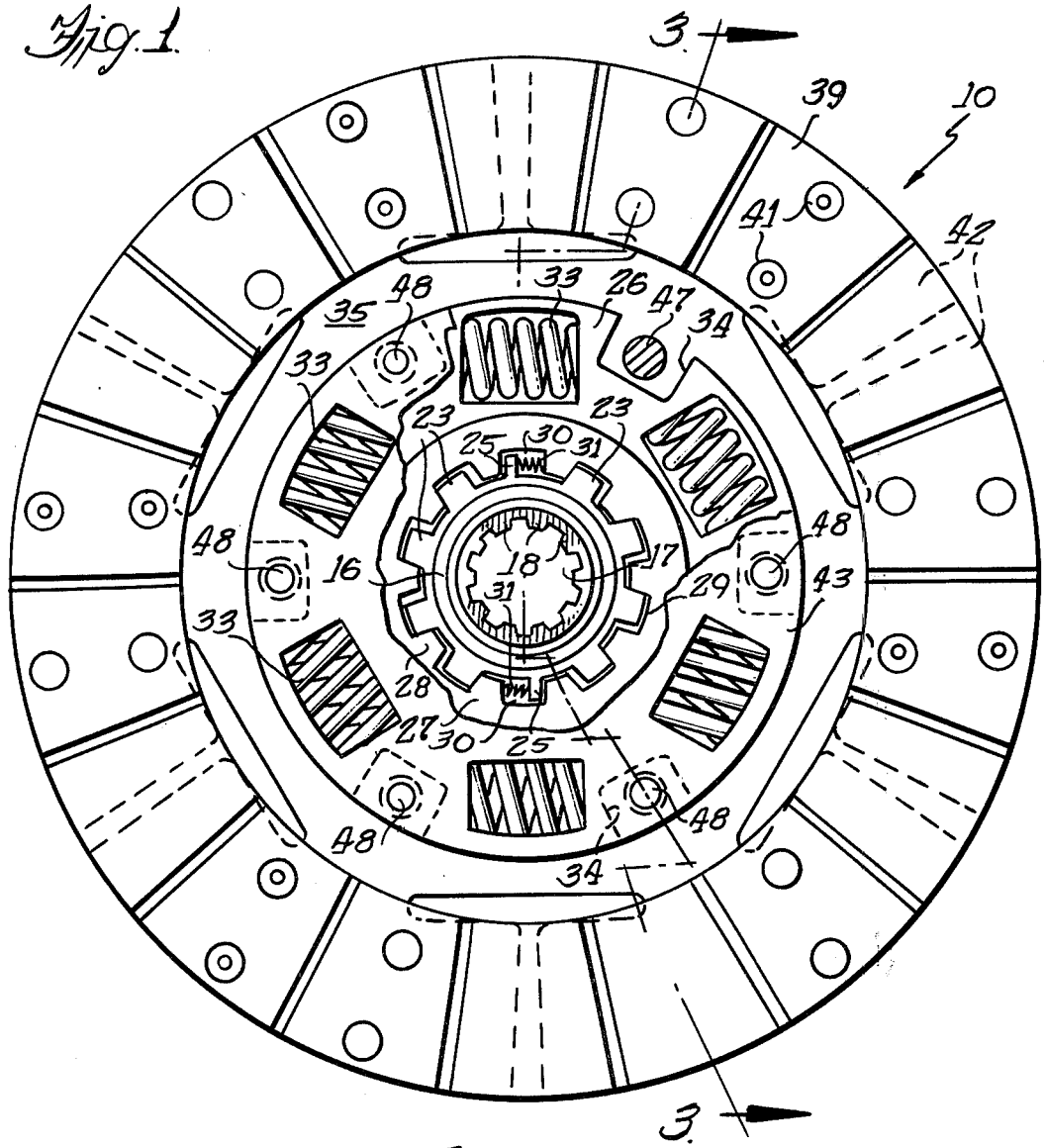
FIG. 1 is a rear elevational view of a clutch driven member embodying the two-stage vibration damper assembly taken from the right-hand side of FIG. 3 with a portion of the spring retainer plate broken away.

Referring more particularly to the disclosure in the drawings wherein are shown illustrative embodiments of the present invention, FIGS. 1 and 3 disclose a clutch driven member assembly 10, including a vibration damper, adapted to be mounted on the end of a driven shaft 11 and positioned between a flywheel 12 driven by a shaft 13 from the engine and a pressure plate 14 yieldably urged toward the flywheel by suitable spring means 15.

Figure 2:
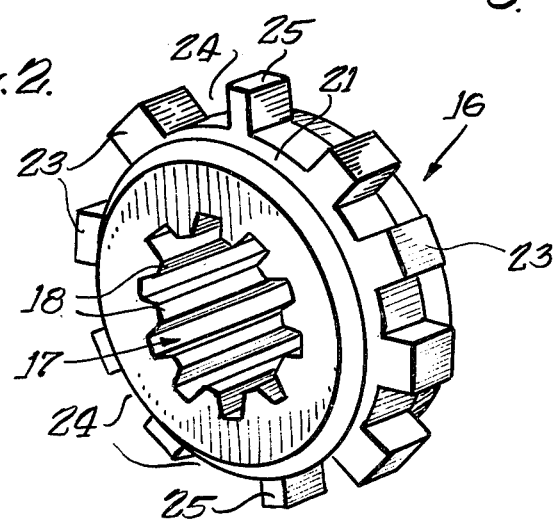
FIG. 2 is an enlarged perspective view of the clutch hub utilized in the damper assembly.

The clutch driven member assembly includes a hub barrel 16 (FIG. 2) having a central opening 17 internally splined at 18 to receive the splined end 19 of the driven shaft 11. The barrel includes a pair of axially spaced shoulders 21, 22 and a plurality of radially outwardly extending splines 23 separated by notches 24. A diametrically opposed pair of splines 25, 25 are substantially reduced in width for a purpose to be later described. Encompassing the hub barrel 16 is a radially extending hub flange 26 having a central thicker portion 27 with an opening provided with radially inwardly extending splines 28 separated by notches 29. The splines 28 are received in the notches 24 on the barrel and the notches 29 receive the splines 23, and a pair of notches 30 receive the reduced width splines 25 of the barrel.

The splines 23 and notches 24 of the barrel and the splines 28 and notches 29 of the flange are so dimensioned, as seen in FIG. 1, to provide a loose fit between the splines and result in a limited amount of lost motion upon rotation of either member. A pair of relatively small compression springs 31 are positioned in the pair of notches 30, 30 receiving the splines 25, 25 so as to yieldably resist the relative movement allowed between the hub barrel 16 and the flange 26 and provide the first stage of an extremely low torsional spring rate. As seen in FIG. 1, the springs 31 are positioned to be effective in only one direction of rotation.

The hub flange 26 has the central splined portion 27 of a greater thickness than the remainder of the flange, and the flange includes a plurality of circumferentially equally spaced spring windows 32 adapted to receive compression springs 33 for the second stage torsional spring rate; the periphery of the flange being provided with elongated notches 34 acting with the remainder of the clutch driven member assembly as a motion limiting means.

A clutch driven plate 35 is positioned at one side of the hub flange 26 and has a central opening 36 to conformably receive the shoulder 21 on the hub barrel 16, and a plurality of spring windows 37 generally axially aligned with the windows 32 in the hub flange. Each opening 37 is of a smaller radial dimension than the opening 32 and has inner and outer chamfered edges 38 acting to prevent lateral movement of the associated spring 33. Beyond the periphery of the hub flange 26, the driven plate 35 is provided with opposed friction facings 39, 39 secured by rivets 41 onto circumferentially spaced pads 42 formed either integral with or riveted onto the periphery of the plate 35.

On the opposite side of the hub flange 26 is located a spring retainer plate 43 having a central opening 44 slightly larger than and loosely receiving the shoulder 22 and a plurality of spring windows 45 having inner and outer chamfered edges 46. Both the driven plate 35 and the spring retainer plate 43 are provided with a plurality of openings generally axially aligned with the notches 34 to receive the reduced ends of rivets or stop pins 47 which are headed at 48 at each end to secure the plates 35 and 43 together. To provide damping friction during the second stage, the thickness of the central flange portion 27 is greater than the space between the reduced shoulders of the stop pin 47 clamping the plates together, resulting in frictional engagement between the plates and the portion 27 on the hub flange 26. Also, the distance between the shoulders 21 and 22 of the hub barrel 16 is less than the thickness of central flange portion 27 so that there is no friction between the plates and the radially outwardly extending splines of the hub barrel.

To maintain a driven plate assembly balance, the internal diameter of the plate 35 defined by opening 36 and the shoulder 21 on the hub barrel 16 should have a pilot fit while concentricity between the plate 43 and the hub barrel is maintained due to the rigid connection of the pins 47 between the plates. The hub flange 26 will remain concentric with the plates and hub barrel as the main compression springs 33 will position and maintain part concentricity.

Considering operation of this clutch driven member and vibration damper assembly, reference is made to FIG. 5 of the drawings wherein a graphic representation is shown for the operation of this assembly. Starting from neutral with the clutch disengaged, when the pressure plate 14 engages the clutch driven member assembly and urges it against the flywheel 12, initial rotation of the plates 35 and 43 will cause rotation of the hub flange 26 through the compression springs 33. Rotation in turn will cause compression of the small springs 31 as the splines 28 of the hub flange 26 move relative to the splines 23 on the hub barrel 16. This initial lost motion is shown as line A in FIG. 5, which appears to be a straight horizontal line. This is not absolutely accurate, but since the torque increase is so small, it would be necessary to enlarge the graph enormously to properly illustrate torque vs. angular displacement. As an illustration, an assembly was tested satisfactorily which had a first stage torsional spring rate of 0.35 inch pounds per degree of deflection.

Once the lost motion between the splines 23 and 28 is taken up, further torque will cause compression of the springs 33 for the second stage in a normal manner as shown by line B. During this second stage of travel, the damping friction between the plates 35, 43 and the central portion 27 of hub flange 26 will also come into play. As seen, there is no initial first stage torsional spring rate for the coast side of the graph as shown by line C.

Figure 6:
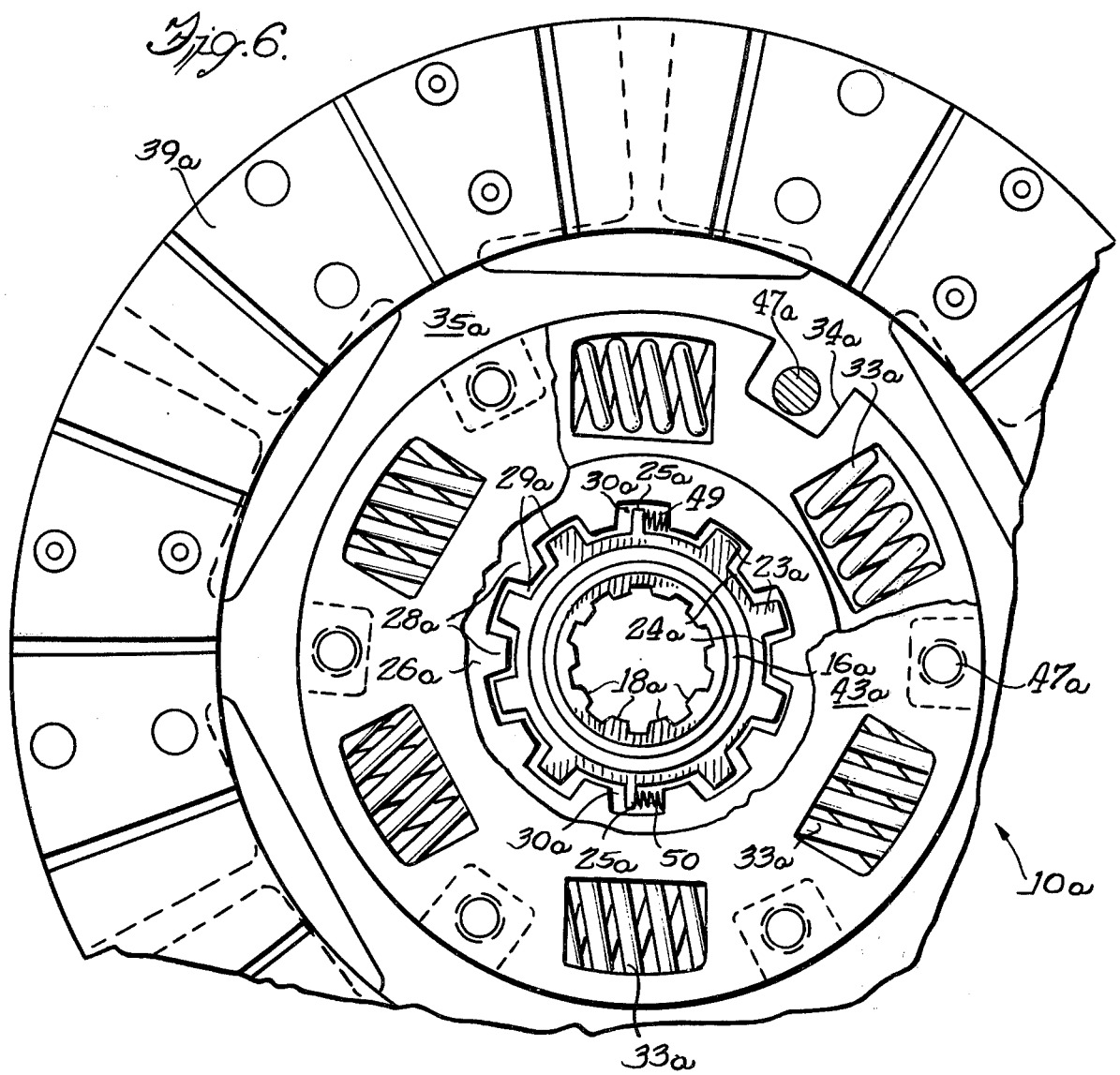
FIG. 6 is a partial rear elevational view of an alternate embodiment of the two-stage vibration damper assembly.

The alternate embodiment of clutch driven member assembly 10a shown in FIG. 6 illustrates a vibration damper arrangement providing a first stage low torsional spring rate for both drive and coast directions. Where elements identical to those in FIGS. 1 through 4 appear, they will be provided with the same reference numeral with a script a. This clutch driven member assembly includes a hub barrel 16a internally splined at 18a and has a plurality of radially outwardly extending splines 23a separated by notches 24a; the splines including a pair of oppositely disposed splines 25a substantially reduced in width. A hub flange 26a is provided with radially inwardly extending splines 28a separated by notches 29a to receive the splines 23a of the hub barrel 16a. The splines and notches of the hub barrel and hub flange are so dimensioned as to provide a limited amount of lost motion on each side of every spline 23a, 28a. Also, the notches 30a receiving the reduced width splines 25a allows for substantial movement in either direction. A pair of relatively light compression springs 49, 50 are positioned in the notches 30a, 30a with one spring 49 resisting movement of the flange 26a relative to the hub barrel 16a in the drive direction, while the spring 50 resists movement in the coast direction.

The driven member assembly also includes the driven plate 35a and the spring retainer plate 43a sandwiching the hub flange 26a and secured together by stop pins 47a. The plates and the flange have axially aligned sets of windows to receive the damper springs 33a, and the driven plate 35a has friction facings 39a secured thereto beyond the periphery of the plate 43a.

Figure 7:
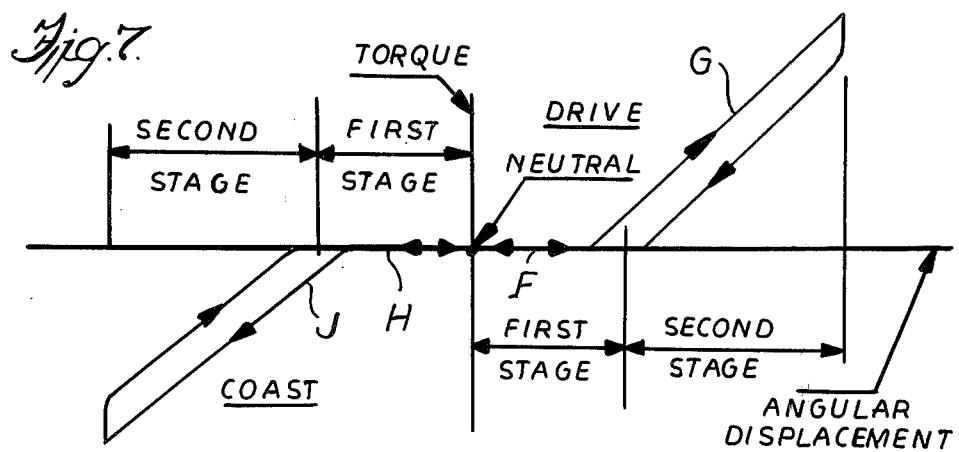
FIG. 7 is a graphic representation similar to FIG. 5 but for the damper assembly of FIG. 6.

Considering the graphic representation shown in FIG. 7, the first stage in drive direction is shown by line F where the small spring 49 resists relative rotation of the hub flange 26a relative to the hub barrel 16a, and the line G illustrates torque vs. angular deflection in the second stage of travel where the compression springs 33a are being compressed. When the vehicle changes from drive to coast, the vibration damper unit returns to neutral and provides a first stage of travel shown by line H where relative rotation is resisted by the small spring 50 and, when the splines engage, the line J illustrates the curve for the compression springs 33a.

I claim:

1. A vibration damper assembly for a vehicle friction clutch comprising a hub barrel having a central splined opening for connection to a driven shaft, external splines on said hub barrel including a pair of diametrically opposed reduced width external splines, a separate hub flange encompassing said hub barrel and having a plurality of internal splines of constant arcuate dimensions loosely meshing with said external splines, said external and internal splines being so dimensioned as to provide limited frictionless relative rotation between the hub barrel and flange, said flange having a pair of opposed notches defined by said internal splines receiving said reduced width splines therein, a small compression spring received in each notch to yieldably engage a reduced width spline to provide a first stage of damper travel, a clutch driven plate rotatably mounted on said hub barrel and terminating at its outer periphery in oppositely disposed friction facings, a spring retainer plate rotatably mounted on said hub barrel, said clutch driven plate and spring retainer plate sandwiching said hub flange therebetween, stop pins securing said plates together for simultaneous rotation, a plurality of circumferentially spaced axially aligned windows in said plates and hub flange, at least one compression spring received within each set of windows to provide a second stage of angular displacement, said hub flange having a central portion of a greater thickness than the remainder of the flange, the distance between said plates at said stop pins being less than the thickness of the central portion of the hub flange, and axially spaced shoulders on said hub barrel for piloting the clutch driven plate and to provide clearance with the spring retainer plate, the spacing between said shoulders being less than the distance between said plates at the central portion of the hub flange, said central portion frictionally engaging said plates to provide damping friction during said second stage of operation.

2. A vibration damper assembly as set forth in claim 1, in which said pair of reduced width splines are normally positioned adjacent a pair of diametrically opposite internal splines on the hub flange, and said pair of small compression springs yieldably resist movement of said reduced width splines in only the drive direction.

3. A vibration damper assembly as set forth in claim 1, in which each of said reduced width splines is normally positioned centrally between a pair of internal splines, and said small springs react against their associated reduced width splines so that the first stage torsional spring rate is provided in both the drive and coast directions.

* * * * *